(12) United States Patent
Neumann

(10) Patent No.: US 9,021,267 B2
(45) Date of Patent: *Apr. 28, 2015

(54) SYSTEM AND METHOD FOR USING DIGITAL SIGNATURES TO ASSIGN PERMISSIONS

(71) Applicant: Sony Corporation, Tokyo (JP)

(72) Inventor: Helmut Neumann, Urbandale, IA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,635

(22) Filed: Jul. 8, 2014

(65) Prior Publication Data

US 2015/0006901 A1 Jan. 1, 2015

Related U.S. Application Data

(63) Continuation of application No. 13/207,316, filed on Aug. 10, 2011, now Pat. No. 8,832,447.

(51) Int. Cl.
| | | |
|---|---|---|
| *H04L 9/32* | (2006.01) | |
| *H04L 9/30* | (2006.01) | |
| H04L 29/06 | (2006.01) | |
| G06F 7/04 | (2006.01) | |
| G06F 17/30 | (2006.01) | |

(52) U.S. Cl.
CPC ............ *H04L 9/3247* (2013.01); *H04L 63/0823* (2013.01); *H04L 9/30* (2013.01)

(58) Field of Classification Search
CPC .............. G06F 21/33; G06F 2211/009; G06F 2221/2113; H04L 63/0823; H04L 9/3247
See application file for complete search history.

(56) References Cited

U.S. PATENT DOCUMENTS

| | | | | |
|---|---|---|---|---|
| 4,868,877 | A * | 9/1989 | Fischer | 713/157 |
| 6,327,652 | B1 * | 12/2001 | England et al. | 713/2 |
| 7,010,691 | B2 * | 3/2006 | Wheeler et al. | 713/170 |
| 7,506,368 | B1 * | 3/2009 | Kersey et al. | 726/12 |
| 7,610,632 | B2 * | 10/2009 | Higuchi | 726/30 |
| 7,757,088 | B2 * | 7/2010 | Abdulhayoglu | 713/175 |
| 7,904,940 | B1 * | 3/2011 | Hernacki et al. | 726/1 |
| 8,020,001 | B2 * | 9/2011 | Lundblade et al. | 713/176 |
| 8,364,711 | B2 * | 1/2013 | Wilkins et al. | 707/783 |
| 8,417,962 | B2 * | 4/2013 | Novak et al. | 713/188 |
| 2003/0172296 | A1 * | 9/2003 | Gunter | 713/201 |
| 2004/0093493 | A1 * | 5/2004 | Bisbee et al. | 713/156 |
| 2005/0071274 | A1 * | 3/2005 | Pfaff et al. | 705/51 |
| 2005/0132229 | A1 * | 6/2005 | Zhang et al. | 713/201 |
| 2005/0246539 | A1 * | 11/2005 | Cofta et al. | 713/176 |
| 2006/0047954 | A1 * | 3/2006 | Sachdeva et al. | 713/165 |
| 2008/0215474 | A1 * | 9/2008 | Graham | 705/37 |
| 2012/0017085 | A1 * | 1/2012 | Carter et al. | 713/168 |

* cited by examiner

*Primary Examiner* — Cordelia Zecher
*Assistant Examiner* — Trang Doan
(74) *Attorney, Agent, or Firm* — John J. Rogitz

(57) ABSTRACT

According to one embodiment of the invention, a method for setting permission levels is described. First, an application and digital signature is received by logic performing the permission assessment. Then, a determination is made as to what permission level for accessing resources is available to the application based on the particulars of the digital signature. Herein, the digital signature being signed with a private key corresponding to a first public key identifies that the application is assigned a first level of permissions, while the digital signature being signed with a private key corresponding to a second public key identifies the application is assigned a second level of permissions having greater access to the resources of an electronic device than provided by the first level of permissions.

10 Claims, 3 Drawing Sheets

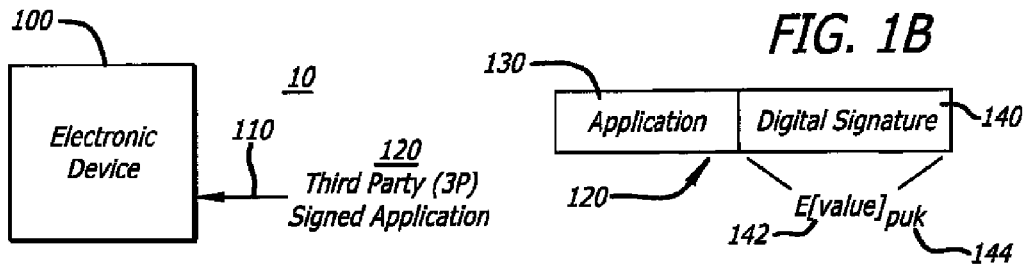
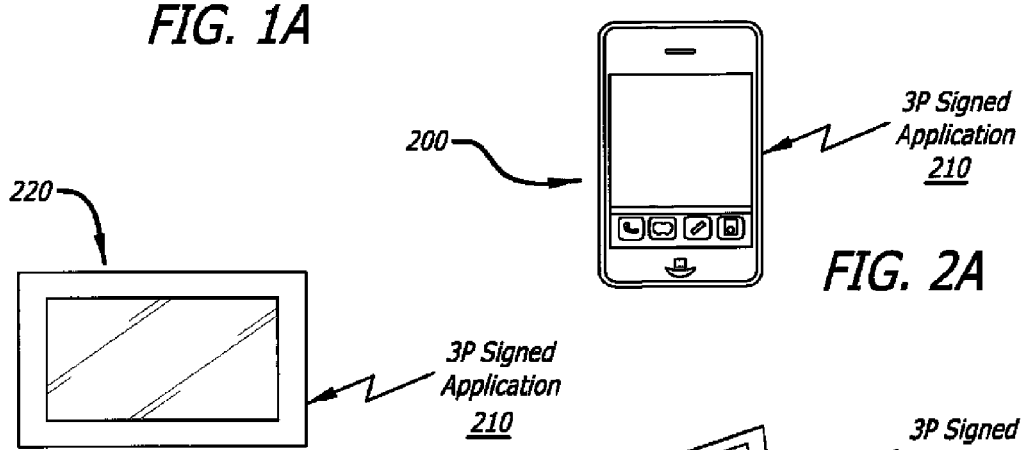
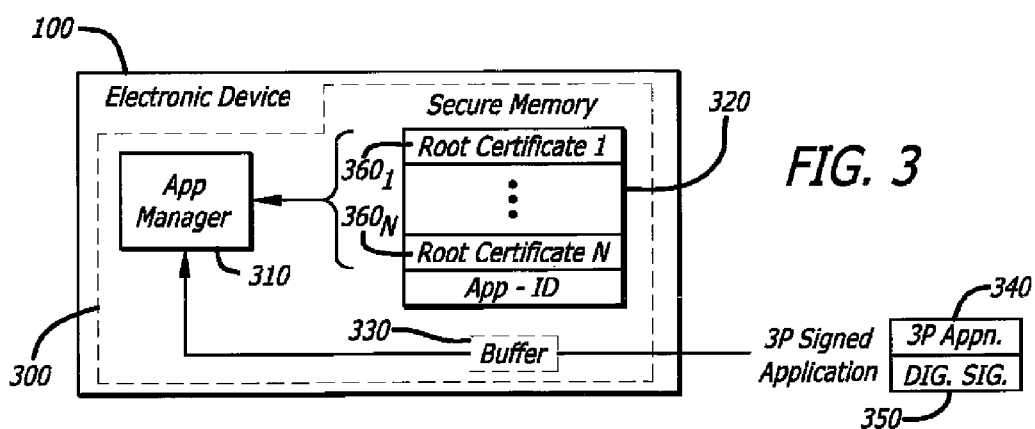

SYSTEM AND METHOD FOR USING DIGITAL SIGNATURES TO ASSIGN PERMISSIONS

BACKGROUND

1. Field

Embodiments of the invention relate to the field of data security and access control. More specifically, one embodiment of the invention relates to a system and method for assigning permissions to an application based on the type of digital signature accompanying the application. These permissions are used to control access to different resources within an embedded system.

2. General Background

Over the last decade, major advancements in high-technology have occurred, and such advancements continue to occur at an accelerated pace. As many of these advancements involve the transmission and storage of digital data, a number of techniques have been developed for controlling access to digital data.

For instance, cryptography is commonly used to securely transmit information between a sending device and a receiving device. One cryptographic technique involves digital signatures, which are normally used to (i) authenticate the identity of a signatory for the digital data, and (ii) ensure that the original digital data has not been tampered with prior to receipt at the receiving device.

Normally, a digital signature accompanies a message, whether it is encrypted or not. In the event that either the signatory of the digital signature is not recognized (i.e., public key of the signatory is not available to the receiving device) or the digital data has been altered after creation of the digital signature, processing of the digital data is avoided. In other words, the digital data is not processed because there is no trust in the authenticity of the data. As used, digital signatures currently offer no granularity with respect to access control (permissions) where different permission levels enable access to different resources at the receiving device.

BRIEF DESCRIPTION OF THE DRAWINGS

Embodiments of the invention are illustrated by way of example and not by way of limitation in the figures of the accompanying drawings, in which like references indicate similar elements and in which:

FIG. 1A is a diagram of electronic device adapted to receive a signed message, whereas FIG. 1B is a diagram of a data structure including a digital signature being part of a hierarchical grouping of digital signatures that provide different permission levels.

FIG. 2A is a first exemplary embodiment of the electronic device illustrated in FIG. 1.

FIG. 2B is a second exemplary embodiment of the electronic device illustrated in FIG. 1.

FIG. 2C is a third exemplary embodiment of the electronic device illustrated in FIG. 1.

FIG. 2D is a fourth exemplary embodiment of the electronic device illustrated in FIG. 1.

FIG. 3 is an exemplary embodiment of logic within the electronic device illustrated in FIG. 1.

DETAILED DESCRIPTION

Figure 4A:
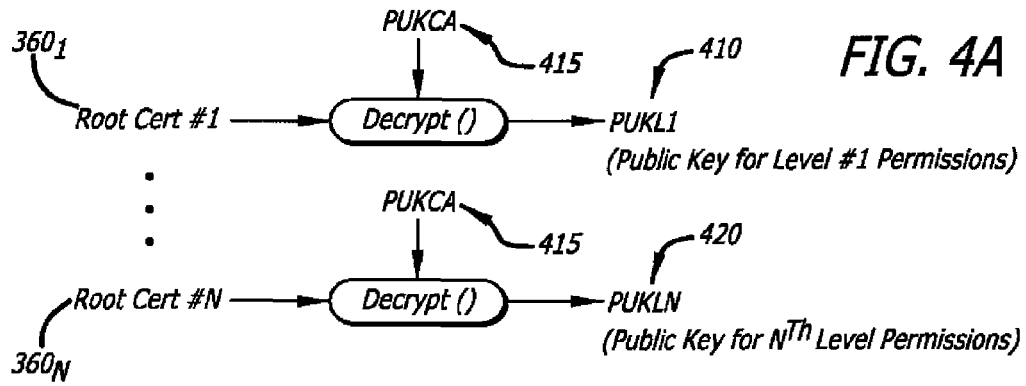
FIG. 4A is an exemplary diagram of the recovery of a public key from multiple root certificates stored internally within the electronic device illustrated in FIG. 1.

Various embodiments of the invention relate to automatically assigning permissions to an incoming application through the use of different digital signatures, where such permissions control the level of access to resources within an embedded system for the incoming application.

According to one embodiment of the invention, implemented within an electronic device, logic is configured to determine if an incoming application has access to certain resources within the system based on particular digital signature associated with the incoming application. For instance, permissions can be assigned based on the level of trust set for different signing parties or based on the particular public key used if a signatory possesses multiple key pairs.

In the following description, certain terminology is used to describe features of the invention. For instance, the term "electronic device" may refer to a device that features one or more electrical components that are adapted to receive and process information, including applications with corresponding digital signatures. For instance, the electronic device may include, but is not limited or restricted to a cellular telephone, a television, a set-top box, a personal digital assistant (PDA), a computer (e.g., mobile, personal, server, mainframe, etc.), a video game console, a digital video disc (DVD) player, or the like.

The terms "unit" and "logic" are representative of hardware and/or software configured to perform one or more functions. For instance, examples of hardware include, but are not limited or restricted to an integrated circuit such as a processor (e.g., a digital signal processor, microprocessor, application specific integrated circuit, a micro-controller, etc.). Of course, the hardware may be alternatively implemented as a finite state machine, a programmable circuit, or even combinatorial logic.

An example of "software" includes an application, namely code that, when executed, assists a user to perform a single task or multiple tasks. The application may take the form of any executable, including an applet, a widget, a routine or even a series of instructions. The software may be stored in any type of non-transitory machine readable medium such as a programmable circuit, a semiconductor memory device such as volatile memory (e.g., random access memory "RAM", etc.) and/or non-volatile memory (e.g., any type of read-only memory "ROM", flash memory, battery-backed RAM, etc.), a hard drive disk, a portable storage device (e.g., an optical disk, a digital video disc, a flash drive, etc.), or the like.

The term "interconnect" is generally defined as an information-carrying pathway for information, where the information may be executable applications with at least one corresponding digital signature or content (e.g., video, audio, text, displayable images, etc.). An interconnect may be based on any communication medium such as a wired physical medium (e.g., a bus, one or more electrical wires, trace, cable, etc.) or a wireless medium (e.g., air in combination with wireless signaling technology).

The term "resource" is a component or a capability offered by the electronic device or another device in communication with the electronic device. For instance, one resource may be a port interface that provides access to a network or access to stored information (e.g., content, contact list, etc.). Another resource may be channel changing functionality for an electronic device such as a television or a set-top box. Yet other resources, may include access to a tuner, a video decoder, an audio decoder, and certain hardware connections providing signal inputs/outputs. General purpose memory or the amount thereof may also be regarded as a resource, but for these standard operating system settings, such as "rlimit" in Unix®/Linux® like OSs, based on the assigned permissions, are used.

Lastly, a "message" is information normally in a structured format such as a frame, a packet or a cell. The message normally includes a header portion and a payload portion.

While this invention is susceptible to embodiments of many different forms, there is shown in the drawings and will herein be described in detail specific embodiments, with the understanding that the present disclosure is to be considered as an example of the principles of the invention and are not intended to limit the invention to the specific embodiments shown and described.

Referring to FIG. 1A, a first exemplary diagram of a communication system 10 consistent with certain embodiments of the invention is shown. Communication system 10 comprises an electronic device 100 that is adapted to receive digital information 120 (e.g. application with a corresponding digital signature) over an interconnect 110.

As shown, in FIG. 1B, digital information 120 comprises an application 130 with a corresponding digital signature 140. It is contemplated that application 130 and digital signature 140 may be provided from a third party provider, namely an entity different than the signatory of digital signature 140. Herein, according to one exemplary embodiment of the invention, digital signature 140 includes a value 142 that is based on a result produced from a hash operation being performed on at least a portion of application 130. The hashed value 142, perhaps along with other data (not shown), is encrypted with a public key 144 to produce digital signature 140.

Referring now to FIGS. 2A-2D, exemplary embodiments of electronic device 100 illustrated in FIG. 1 is shown. Herein, as shown in FIG. 2A, electronic device 100 may be a cellular telephone 200 that is adapted to receive one or more executable applications 210 with digital signatures over cellular and/or networked (e.g. WiFi™) based interconnects.

Similarly, as shown in FIGS. 2B and 2C, electronic device 100 may be a television 220 or a DVD player 230 (with optional recording functionality) that is adapted to receive one or more executable applications 210 with digital signatures over a connector such as a network interface connector (e.g., Ethernet port, wireless transceiver supporting WiFi™, IEEE 802.11 or Bluetooth™ standards, etc.), a cable connector (e.g., High-Definition Multimedia Interface "HDMI" connector, Video Graphics Array "VGA" connector, Coax connector, etc.), a Universal Serial Bus (USB) connector, or the like.

Furthermore, as shown in FIG. 2D, electronic device 100 may be a computer 240 that is adapted to receive one or more executable applications 210 with digital signatures over a connector such as a wired or wireless network interface connector (e.g., Ethernet port, wireless transceiver supporting Wi-Fi™, IEEE 802.11 or Bluetooth™ standards, etc.), a Universal Serial Bus (USB) connector, or the like.

For these exemplary embodiments, it is contemplated that executable application(s) 210 may be transmitted on the same or a different interconnect than the content itself.

Referring now to FIG. 3, an exemplary embodiment of logic 300 within electronic device 100 of FIG. 1 is shown. Herein, designed to determine the permission level of an application, logic 300 comprises an application manager unit 310, a memory unit 320 and an optional buffer unit 330. Buffer unit 330 is optional as it is designed to temporarily store an incoming application 340 and its corresponding digital signature 350 upon receipt from a remote source (e.g., on-line application store, third-party provider, etc.). For greater security, it is contemplated that at least two or all of the noted components, namely application manager unit 310, memory unit 320 and buffer unit 330, may be placed within a single semiconductor or chipset package.

More specifically, according to this embodiment of the invention, memory 320 comprises any type of non-volatile memory (e.g., flash, Read Only memory, battery-backed random access memory, etc.) that can persistently store one or more root certificates $360_1$-$360_N$ (N>1). Each root certificate $360_1$-$360_N$ includes a different public key, but such keys (along with other information) are signed with a private key of a certificate authority (e.g. a trusted entity such as a financial institution, governmental entity, a third-party entity, etc.). The corresponding public key (PUKCA) for the certificate authority is available to the public at large.

As shown in FIGS. 4A-4D, root certificates $360_1$-$360_N$ are used to designate different permission levels based on the public keys associated with these certificates $360_1$-$360_N$. In particular, in FIG. 4A, a public key associated with a first permission level (PUKL1) 410 is recovered from root certificate $360_1$ using PUKCA 415. Similarly, another public key (PUKLN) 420 associated with an $N^{th}$ permission level that differs from PUKL1 410 is recovered from root certificate 360N. According to one embodiment of the invention, four (N=4) root certificates $360_1$-$360_4$ are used to support four (4) different permission levels.

Figure 4B:
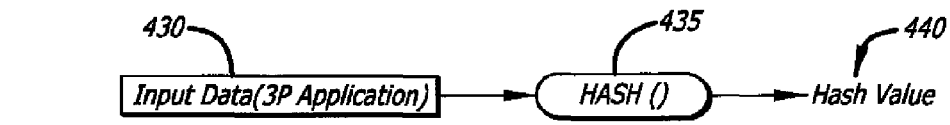
FIG. 4B is an exemplary diagram of a one-way hash operation being performed on an incoming application along with a corresponding digital signature as illustrated in FIG. 3.

Referring back to FIG. 3, application manager unit 310 is logic (e.g. a processor) that is adapted to perform operations on application 340 and the one or more digital signatures 350 accompanying application 340 in order to determine a permission level for application 340. For instance, as shown in FIG. 4B, application manager unit 310 may be implemented as a controller that is adapted to perform an operation on input data 430 (e.g., some or all of application 340) in accordance with a particular function 435. This function may include, but is not limited or restricted to a hash function as shown (e.g., any version of Secure Hash Algorithm "SHA" such as SHA-1, SHA-2, etc.), a logical function (e.g., Exclusive OR "XOR"), or the like.

Upon performing this operation on input data 430, application manager unit 310 produces a result 440 (referred to as "hash value"). Hash value 440 is used for comparison as set forth in FIG. 4C.

Figure 4C:
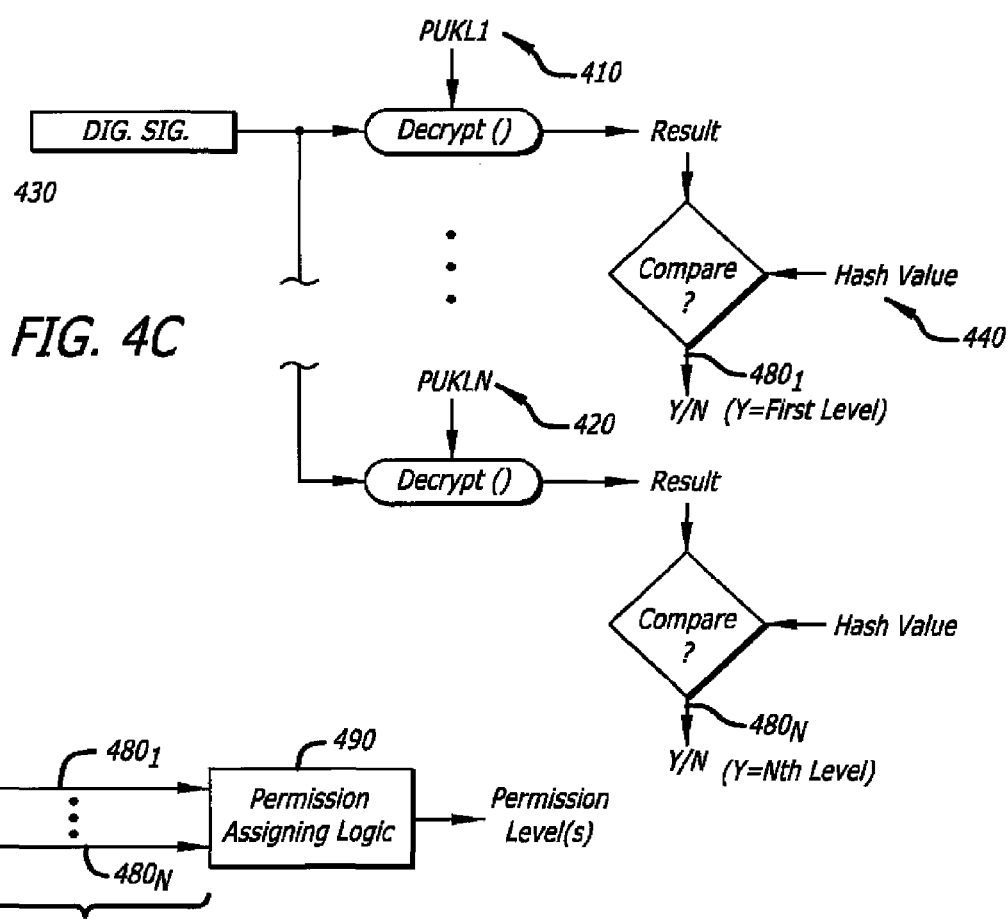
FIG. 4C is an exemplary diagram of an operation to determine digital signature type assigned to the application.
Figure 4D:
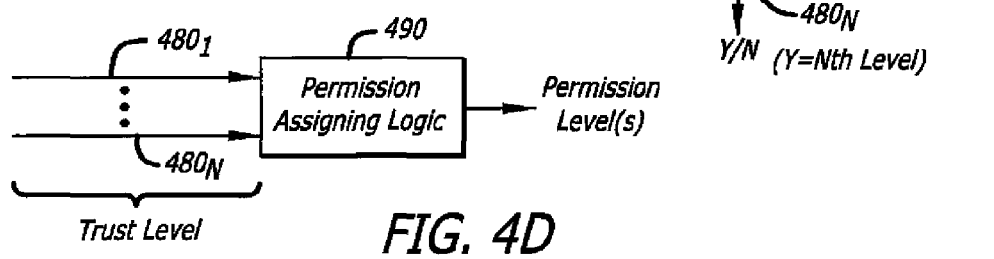
FIG. 4D is an exemplary diagram of an operation to determine what permission level is afforded the user of the electronic device based on determined digital signature type.

Referring to FIG. 4C, root certificate(s) $360_1$-$360_N$ are processed to recover public keys (PUKL1, . . . , PUKLN), which are used to recover data within digital signature(s) 350. If the recovered data compares with hash value 440, application manager unit 310 has effectively determined the permission level(s) $480_1$-$480_N$, which is based on which level is associated with the particular public key as shown in FIG. 4D.

As an illustrative example, four levels of permission $480_1$-$480_N$ (N=4) may be associated with an application based on a permission hierarchy supported by electronic device 100 (e.g., a Sony® television). According to this illustrative embodiment, application 340 is assigned a "first permission level" when digital signature 350 associated with application 340 of FIG. 3 is "self signed," meaning that the party creating application 340 (e.g. an independent third-party provider) signed digital signature 350. Hence, assigned to the first permission level, application 340 is afforded minimal permissions such as access to display-based resources only.

Unlike the first (lowest) permission level, application 240 is assigned a "second permission level" when digital signature 350 is signed by a trusted affiliate of the manufacturer of electronic device 100 (e.g., Sony Corporation). For the second permission level, more resources are available to the application than if accompanied by a digital signature of a first permission level. An example of additional resources may include, but are not limited or restricted to access to Internet resources such as video chat functionality supported by a Sony® television.

The application may be assigned a third permission level in a situation where the manufacturer of electronic device 100 (e.g., Sony Corporation) signed digital signature 350. As a result, full permissions to access resources available to electronic device 100 (e.g., a Sony® television) are provided. However, when assigned to third permission level, no system level permissions, such as controlling the upload of software updates or software patches, are granted to application 340.

The application may be assigned a "fourth permission level" is a situation where the manufacturer signed digital signature 350 using a different, and perhaps more secure private key, where super-user permissions are provided in which application 340 has full access to all resources available to the Sony® television and may include system level access.

It is contemplated that the granularity of the permission levels is adjustable based on the number of differentiating factors associated with the different digital signatures. For instance, one factor may be the signatory, or a combination of signatories if a nested digital signature scheme is used. Another factor may be the particular public key needed to recover data from the digital signature (i.e. which counterpart key was used for digitally signing purposes). Another factor may be information (e.g. permission settings) within the digital signature itself.

Figure 5:
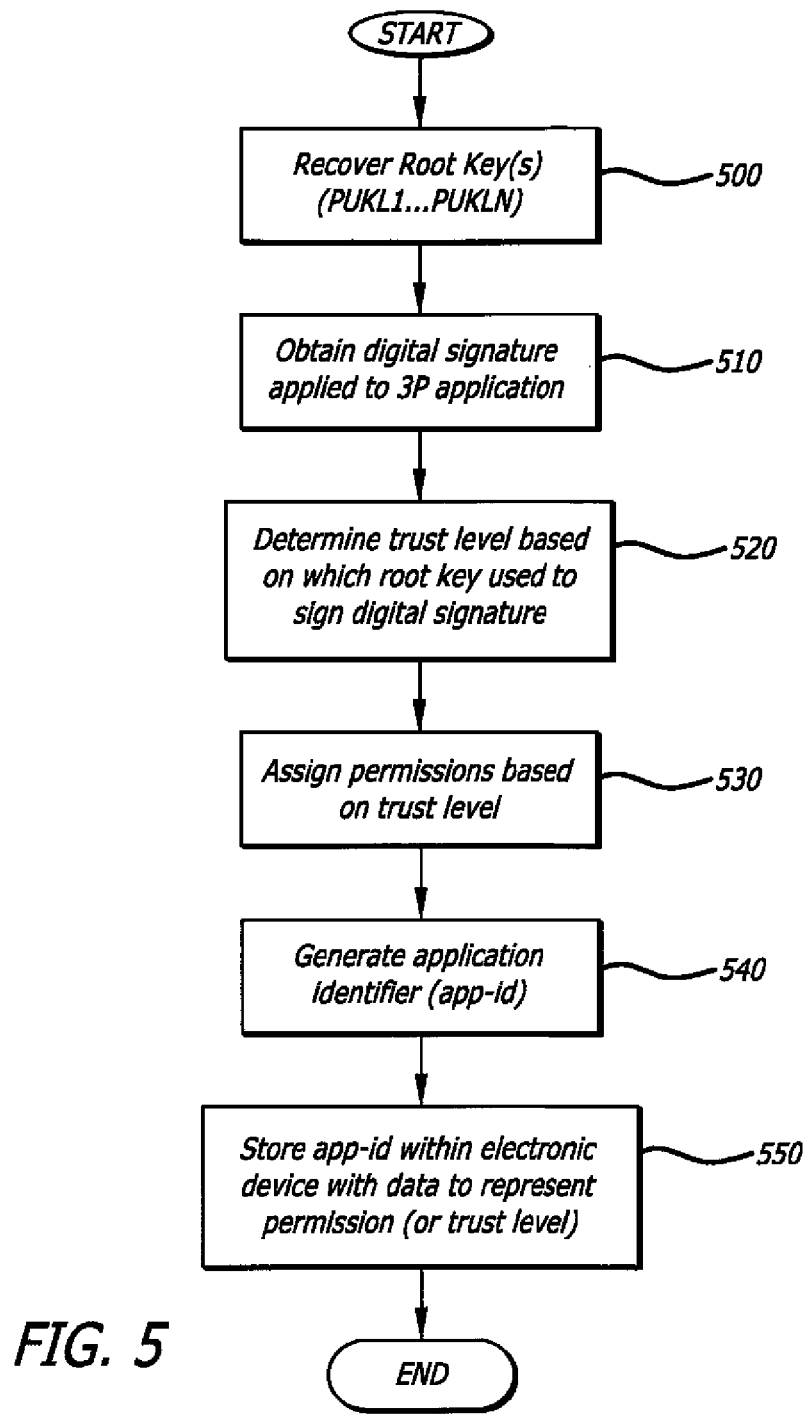
FIG. 5 is an exemplary flowchart directed to the assigning of permissions and generation of application identifier for subsequent use in communications with internal components within the electronic device.

Referring now to FIG. 5, an exemplary flowchart directed to the assigning of permissions for an application (e.g., third-party "3P" application) and generation of an application identifier for subsequent use in communications with internal components within electronic device 100 is shown.

Herein, multiple root keys (PUKL1, . . . , PUBKLN) are pre-stored within the electronic device (block 500). Such pre-storage may be conducted during manufacture of the electronic device so that all keys are securely stored prior to shipment of the electronic device. The root keys may be securely stored or may be stored within a digital certificate as shown in FIG. 4A. Alternatively, the keys may be downloaded to the electronic device for persistent storage after manufacture (e.g., automatically downloaded during an on-line or cellular-based registration process).

Thereafter, upon receipt of the signed application, the digital signature is extracted (block 510) and a determination is made as to the trust level assigned to the application (block 520). As set forth in FIGS. 4B-4C, the trust level is based on the particulars for the digital signature. For instance, the application may have a higher trust level if the digital signature is signed by either the manufacturer of the electronic device or an affiliate of the manufacturer in lieu of the third-party source of the application. Such determination may be accomplished through a series of comparisons to determine if the public key belonging to the manufacturer, the affiliate, third-party source or the like is able to recover data from the digital signature.

After determining the trust level, permission assigning logic within the electronic device determines which permission level is afforded the application (block 530). For instance, the application may support only a single digital signature so that the assigned trust level may be based on the particular public key that corresponds to the private key used to create the digital signature. Alternatively, the application may support multiple digital signatures so that the assigned trust level may be based on the particular combination of public keys that provide access to the content of the digital signatures.

Referring still to FIG. 5, after determining the permission level for the application, an identifier is created for the application (hereinafter referred to as an "application identifier") as set forth in block 540. The application identifier is a value that can be exchanged between components within the electronic device that inherently identifies the permission level for the electronic device. The application identifier and data representative of the permission level are stored within the electronic device (block 550).

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. Device comprising:
   at least one non-transitory computer readable storage medium with instructions which when executed by at least one processor configure the processor for:
   receiving an application signed by a digital signature, the application seeking access to one or more resources of an electronic device;
   processing the application and/or digital signature using a function to render a function result;
   using a first public key to extract information from the digital signature;
   using a second public key to extract information from the digital signature;
   comparing the function result with the information extracted using the first public key;
   comparing the function result with the information extracted using the second public key;
   responsive to determination that the function result does not match information extracted by the first or second public key, not granting the application access to the resources of the electronic device;
   responsive to determination that the function result matches the information extracted using the first public key, granting the application access to one or more resources of the electronic device at a first level of access; and
   responsive to determination that the function result matches the information extracted using the second public key, granting the application access to one or more resources of the electronic device at a second level of access, the second level of access granting greater access to the resources than the first level of access.

2. The device of claim 1, wherein the instructions when executed by the processor configure the processor for:

according the first level of access to the application responsive to a determination that the digital signature accompanying the application is from an originator of the application, and according the second level of access to the application responsive to a determination that the digital signature accompanying the application is from a trusted affiliate of a manufacturer of the electronic device.

3. The device of claim 1, wherein the instructions when executed by the processor configure the processor for:
according the first level of access to the application responsive to a determination that the digital signature accompanying the application is from a trusted affiliate of a manufacturer of the electronic device, and according the second level of access to the application responsive to a determination that the digital signature accompanying the application is from a manufacturer of the electronic device using a first private key.

4. The device of claim 1, wherein the instructions when executed by the processor configure the processor for:
according the first level of access to the application responsive to a determination that the digital signature accompanying the application is from a manufacturer of the electronic device using a first private key, and according the second level of access to the application responsive to a determination that the digital signature accompanying the application is from a manufacturer of the electronic device using a second private key.

5. A device comprising:
a non-transitory memory adapted to store a plurality of root certificates, each root certificate including a respective public key, each public key being associated with a respective permission level; and
instructions which when executed by at least one processor configure the processor to:
receive an application with a digital signature;
grant the application a first level of access to a computer resource responsive to a determination that the digital signature is associated with a first public key associated with a first permission level; and
grant the application a second level of access to the computer resource responsive to a determination that the digital signature is associated with a second public key associated with a second permission level, the first level of access being different from the second level of access.

6. The device of claim 5, wherein the instructions when executed by the processor configure the processor to:
extract, using a function applied to the application and/or digital signature, a function result;
process the function result using at least the first and second public keys to render at least respective first and second results;
compare at least the first and second results to the function result to render first and second outcomes;
responsive to a determination that the first outcome meets a condition, grant a first level of permission to the application to access to resources on the electronic device;
responsive to a determination that the second outcome meets a condition, grant a second level of permission to the application to access resources on the electronic device, the first and second levels of permission being greater than a denial of access to all resources of the electronic device.

7. The device of claim 6, wherein the instructions when executed by the processor configure the processor for granting, based on the comparing, a lowest level of permission to the application responsive to a determination that the digital signature is from an originator of the application.

8. The device of claim 7, wherein the instructions when executed by the processor configure the processor for granting, based on the comparing, a next-lowest level of permission to the application responsive to a determination that the digital signature is from a trusted affiliate of a manufacturer of the electronic device, the next-lowest level of permission being greater than the lowest level of permission.

9. The device of claim 8, wherein the instructions when executed by the processor configure the processor for granting, based on the comparing, a first manufacturer level of permission to the application responsive to a determination that the digital signature is from a manufacturer of the electronic device using a first private key, the first manufacturer level of permission being greater than the next-lowest level of permission.

10. The device of claim 9, wherein the instructions when executed by the processor configure the processor for granting, based on the comparing, a second manufacturer level of permission to the application responsive to a determination that the digital signature is from a manufacturer of the electronic device using a second private key, the second manufacturer level of permission being greater than the first manufacturer level of permission.

* * * * *